US011492151B2

(12) United States Patent
Rampone et al.

(10) Patent No.: US 11,492,151 B2
(45) Date of Patent: Nov. 8, 2022

(54) ATMOSPHERIC SUIT WITH INTEGRATED FIBER OPTIC SENSING NETWORK

(71) Applicant: Hamilton Sundstrand Corporation, Charlotte, NC (US)

(72) Inventors: Joseph C. Rampone, Colchester, CT (US); Walter Thomas Schmidt, Marlborough, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 277 days.

(21) Appl. No.: 16/872,715

(22) Filed: May 12, 2020

(65) Prior Publication Data

US 2021/0354858 A1 Nov. 18, 2021

(51) Int. Cl.
| *B64G 6/00* | (2006.01) |
| *A41D 1/00* | (2018.01) |
| *G01L 1/24* | (2006.01) |
| *G01K 11/32* | (2021.01) |

(52) U.S. Cl.
CPC ............... *B64G 6/00* (2013.01); *A41D 1/005* (2013.01); *G01K 11/32* (2013.01); *G01L 1/243* (2013.01)

(58) Field of Classification Search
CPC .......... B64G 6/00; A41D 1/005; G01K 11/32; G01K 3/10; G01K 11/3206; G01L 1/243
See application file for complete search history.

(56) References Cited

U.S. PATENT DOCUMENTS

| 6,145,551 A * | 11/2000 | Jayaraman ............... D03D 3/02 |
| | | 139/55.1 |
| 8,079,247 B2 | 12/2011 | Russell et al. |
| 2005/0146076 A1 | 7/2005 | Alexander et al. |
| 2016/0062333 A1 | 3/2016 | Jayaraman |

* cited by examiner

*Primary Examiner* — Tony Ko
(74) *Attorney, Agent, or Firm* — Cantor Colburn LLP

(57) ABSTRACT

An atmospheric suit includes a torso portion with one or more layers, and fibers of a first material arranged in each of the one or more layers. Optical fibers are interspersed with the fibers of the first material in each of the one or more layers.

16 Claims, 3 Drawing Sheets

ATMOSPHERIC SUIT WITH INTEGRATED FIBER OPTIC SENSING NETWORK

BACKGROUND

Exemplary embodiments pertain to the art of atmospheric protective equipment and, in particular, to an atmospheric suit with a fiber optic sensing network.

In certain environments, an atmospheric suit is worn for protection and also to maintain a specific environment for the wearer. In a deep space application, for example, an extravehicular mobility unit (i.e., space suit) includes a hard upper torso for protection and also contains gases to sustain the wearer.

BRIEF DESCRIPTION

In one embodiment, an atmospheric suit includes a torso portion with one or more layers, and fibers of a first material arranged in each of the one or more layers. Optical fibers are interspersed with the fibers of the first material in each of the one or more layers.

Additionally or alternatively, in this or other embodiments, the atmospheric suit also including two of the layers.

Additionally or alternatively, in this or other embodiments, the fibers of the first material and the optical fibers in one of the layers are offset by at least 45 degrees from the fibers of the first material and the optical fibers in another of the layers.

Additionally or alternatively, in this or other embodiments, the atmospheric suit is an extravehicular mobility suit for deep space applications, and the fibers of the first material are carbon, glass, or thermoplastic fibers.

Additionally or alternatively, in this or other embodiments, the atmospheric suit also includes a light source, a photodetector, and processing circuitry.

Additionally or alternatively, in this or other embodiments, the processing circuitry identifies an anomaly based on the photodetector, the anomaly including breakage of one or more of the optical fibers, strain, pressure change, or temperature change.

Additionally or alternatively, in this or other embodiments, the processing circuitry identifies an area of the torso portion that experienced the anomaly.

Additionally or alternatively, in this or other embodiments, the processing circuitry generates an alert based on identification of the strain, the pressure change, or the temperature change.

Additionally or alternatively, in this or other embodiments, the atmospheric suit also includes a helmet, wherein the processing circuitry provides the alert to the helmet, and the helmet outputs an audio or visual indication of the alert to the wearer of the atmospheric suit.

Additionally or alternatively, in this or other embodiments, the processing circuitry transmits the alert outside the atmospheric suit.

In another embodiment, a method of manufacturing an atmospheric suit includes assembling a torso portion with one or more layers, and arranging fibers of a first material in each of the one or more layers. The method also includes interspersing optical fibers with the fibers of the first material in each of the one or more layers.

Additionally or alternatively, in this or other embodiments, the method also includes assembling the torso portion with two of the layers.

Additionally or alternatively, in this or other embodiments, the method also includes arranging the fibers of the first material and the optical fibers in one of the layers to be offset by at least 45 degrees from the fibers of the first material and the optical fibers in another of the layers.

Additionally or alternatively, in this or other embodiments, the atmospheric suit is an extravehicular mobility suit for deep space applications, and the arranging the fibers of the first material includes arranging carbon, glass, or thermoplastic fibers.

Additionally or alternatively, in this or other embodiments, the method also includes arranging a light source, a photodetector, and processing circuitry corresponding with the optical fibers.

Additionally or alternatively, in this or other embodiments, the method also includes configuring the processing circuitry to identify an anomaly based on the photodetector, the anomaly including breakage of one or more of the optical fibers, strain, pressure change, or temperature change.

Additionally or alternatively, in this or other embodiments, the configuring includes the processing circuitry identifying an area of the torso portion that experienced the anomaly.

Additionally or alternatively, in this or other embodiments, the configuring includes the processing circuitry generating an alert based on identification of the strain, the pressure change, or the temperature change.

Additionally or alternatively, in this or other embodiments, the method also includes including a helmet for attachment with the torso portion, wherein the configuring includes the processing circuitry providing the alert to the helmet, and the helmet outputting an audio or visual indication of the alert to the wearer of the atmospheric suit.

Additionally or alternatively, in this or other embodiments, the configuring includes the processing circuitry transmitting the alert outside the atmospheric suit.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, an atmospheric suit is needed in certain environments, such as a deep space environment. Embodiments of the systems and methods detailed herein relate to an atmospheric suit with an integrated fiber optic sensing network. The fiber optic sensing facilitates monitoring the health and safety of the wearer as well as the integrity of the suit. For example, when the wearer of an extravehicular mobility suit is engaged in an extravehicular activity, that wearer may be susceptible to micrometeoroid impacts, impact with the space vehicle (e.g., during a space walk), or falls. These events may affect the integrity of the extravehicular mobility suit immediately or gradually and result in variations in pressure or temperature inside the extravehicular mobility suit that are detrimental to the wearer, for example. Based on integration of a fiber optic sensing network, these events may be detected and mitigated.

According to an exemplary embodiment, an alert is provided to the wearer of the extravehicular mobility suit, based on the integrated fiber optic sensing network, regarding a breach or potential breach in the suit so that the wearer may return the vehicle. According to exemplary embodiments, information or alerts regarding the extravehicular suit may be transmitted to a rover or the vehicle. While a deep space application is specifically discussed for explanatory purposes, the wearable fiber optic sensing network detailed herein may be integrated into other atmospheric suits in other environments. For example, the fiber optic sensing network may be used in underwater (e.g., in an atmospheric diving suit), earth-based (e.g., in a hazmat suit or contamination suit), high-altitude (e.g. in a flight suit) and sub-surface applications.

Figure 1:
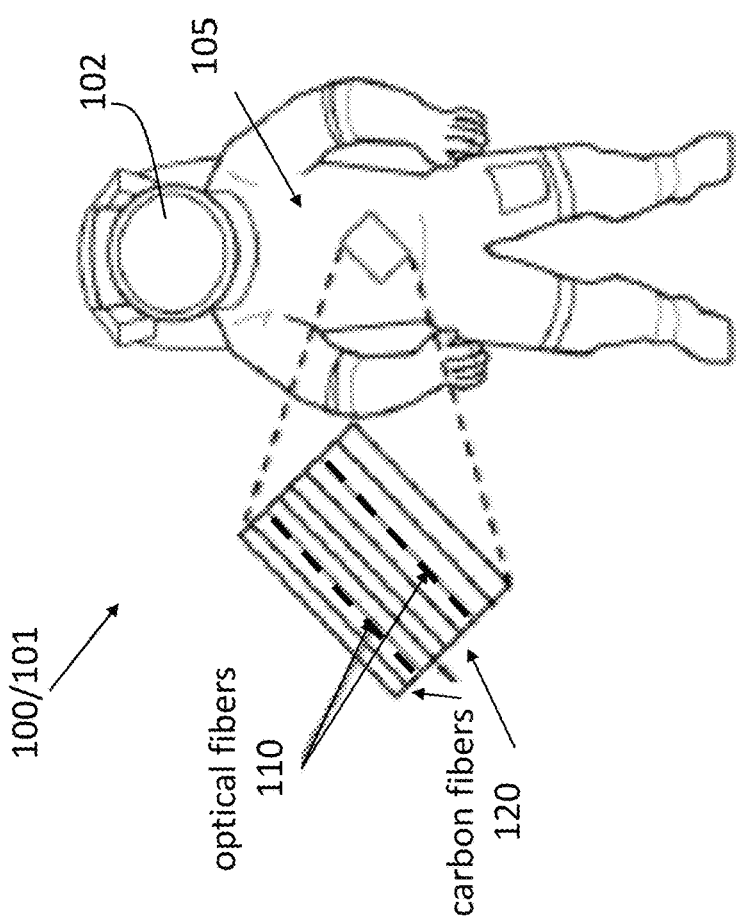
FIG. 1 shows an exemplary atmospheric suit with a fiber optic sensing network according to one or more embodiments.

FIG. 1 shows an exemplary atmospheric suit 100 with a fiber optic sensing network 300 (FIG. 3) according to one or more embodiments. The exemplary atmospheric suit 100 shown in FIG. 1 is an extravehicular mobility unit 101. The extravehicular mobility unit 101 includes a helmet 102 and a hard upper torso 105. The hard upper torso 105 provides a structural mounting interface for the helmet 102, arms, lower torso, primary life support subsystem, display and control module, and electrical harness (not shown). The helmet 102 may attach to the hard upper torso 105 to maintain the atmosphere within the atmospheric suit 100. The helmet 102 may be equipped to provide a heads up display or other visual indication (e.g., red light to indicate an alert) regarding the integrity of the hard upper torso 105. The helmet 102 may alternately or additionally enable audio alerts to the wearer. As indicated, the material of the hard upper torso 105 includes optical fibers 110 in addition to other fibers 120 in accordance with one or more embodiments. The structure of the hard upper torso 105 is further discussed with reference to FIG. 2, and the fiber optic sensing network 300 that uses the optical fibers 110 is further discussed with reference to FIG. 3.

Figure 2:
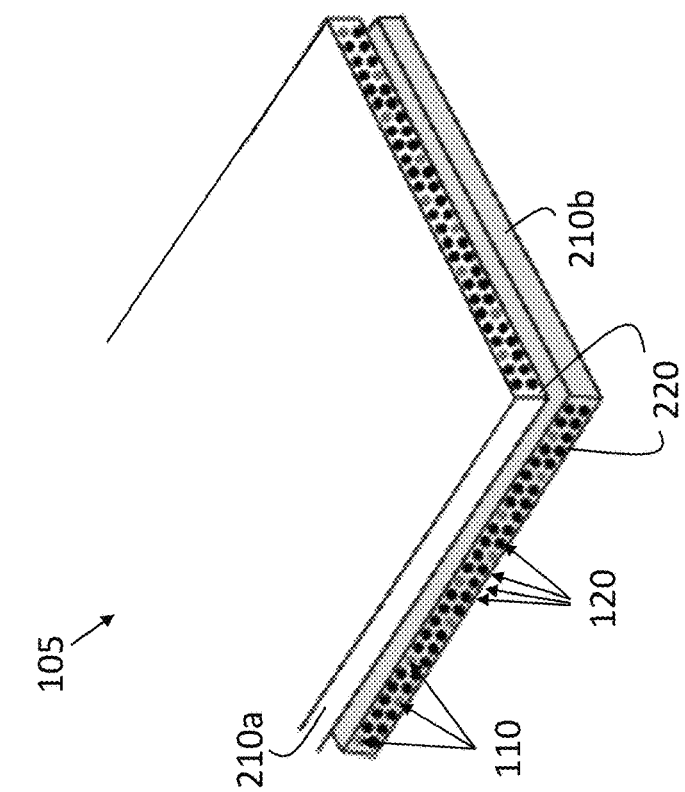
FIG. 2 details aspects of the hard upper torso of the extravehicular mobility unit according to one or more embodiments.

FIG. 2 details aspects of the hard upper torso 105 of the extravehicular mobility unit 101, which is the exemplary atmospheric suit 100 shown in FIG. 1, according to one or more embodiments. Two layers 210a, 210b (generally referred to as 210 and also referred to as plies) of material are shown. The number and thickness of the layers 210 represent a balance between the fact that an increasing number of layers 210 increase strength and protection to the wearer but also increase weight and bulkiness for the wearer of the hard upper torso 105. The other fibers 120 (e.g., carbon, glass, thermoplastic) in each of the layers 210 are needed for structural integrity and strength. However, as shown, a few of those other fibers 120 are replaced with optical fibers 110. The diameter of optical fibers 110, which is on the order of tens of micrometers, may be greater than the diameter of the other fibers 120 (e.g., greater than the diameter of carbon fibers) but less than the thickness of each layer 210.

While the two exemplary layers 210 including optical fibers 110 are shown, the hard upper torso 105 may have additional layers 210 (e.g., up to 9 plies) with only a subset of those layers 210 including the optical fibers 110. According to an exemplary embodiment, only the two or three outermost layers 210 may include the optical fibers 110. Including the optical fibers 110 in the outermost layers increases sensitivity to impacts. According to another exemplary embodiment, including optical fibers 110 in one or more interior layers (i.e., layers closest to the wearer) increases sensitivity to temperature or pressure changes that affect the wearer. According to further embodiments, optical fibers 110 may be included in a combination of interior and exterior layers 210 or in all the layers 210 of the hard upper torso 105. Each layer 210 is a polymer matrix composite. The polymer matrix material 220 may be thermosetting or thermoplastic polymers, for example. The other fibers 120 and, when present, the optical fibers 110 are embedded in the polymer matrix material 220 and are subjected to a temperature increase during a curing process that is used to bond the components into the polymer matrix composite of the layer 210.

As FIG. 2 indicates, the axial arrangement of the optical fibers 110 and carbon fibers 120 in one layer 210a is perpendicular to the axial arrangement of the optical fibers 110 and carbon fibers 120 in an adjacent layer 210b. While a perpendicular arrangement is shown for explanatory purposes, the two layers 210a, 210b may be offset by a different angle. Generally, the offset angle may be at least 45 degrees. This offset arrangement facilitates localization of detection using the fiber optic sensing network 300. That is, the optical fibers 110 in adjacent layers 210 form a grid that facilitates detection of the area in which an anomaly is detected. The anomaly may be indicated by strain, a break, temperature variation, or pressure variation. For example, a micrometeoroid impact or a fall may result in the disturbance of optical fibers 110 in each of the layers 210 in the area of the extravehicular mobility unit 101 affected by the impact or fall. While the hard upper torso 105 and the carbon fibers 120 may be specific to the extravehicular mobility unit 101, the integration of the optical fibers 110 shown in FIG. 2 may be implemented with other materials in other atmospheric suits 100 (e.g., atmospheric diving suit, hazmat suit or contamination suit, flight suit).

Figure 3:
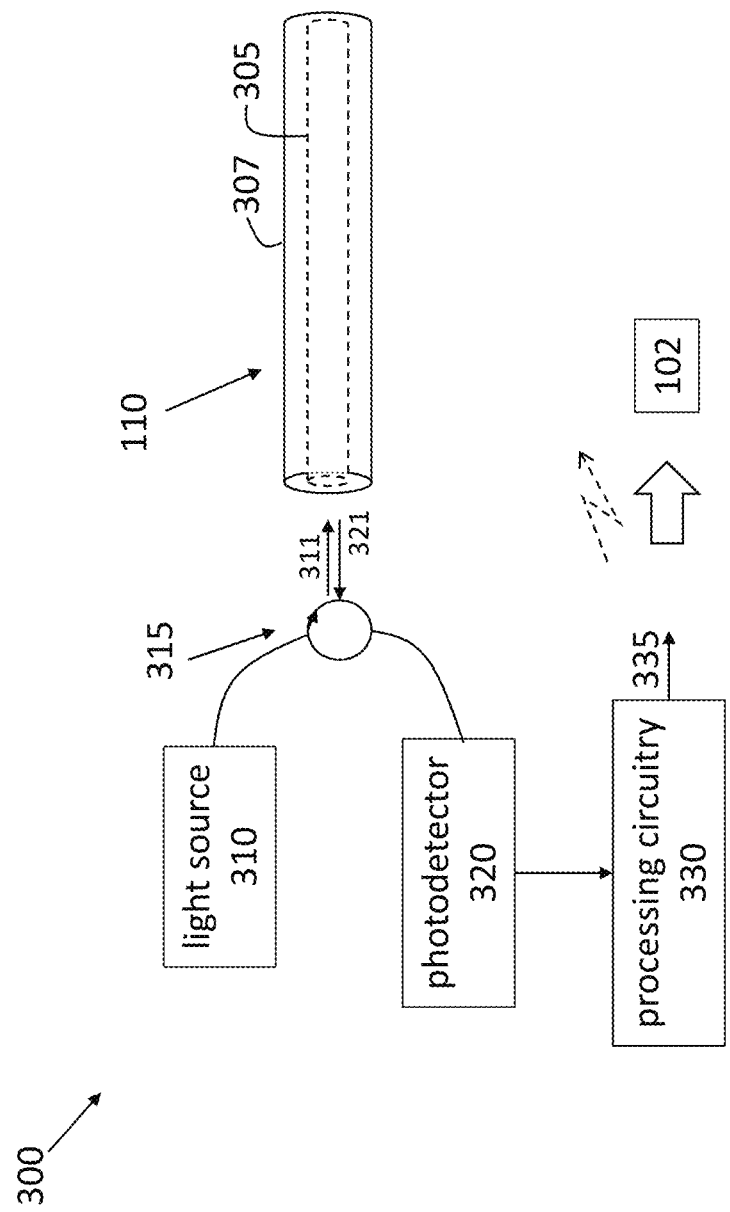
FIG. 3 is a block diagram of aspects of an exemplary fiber optic sensing network integrated into an atmospheric suit according to one or more embodiments.
Figure 4:
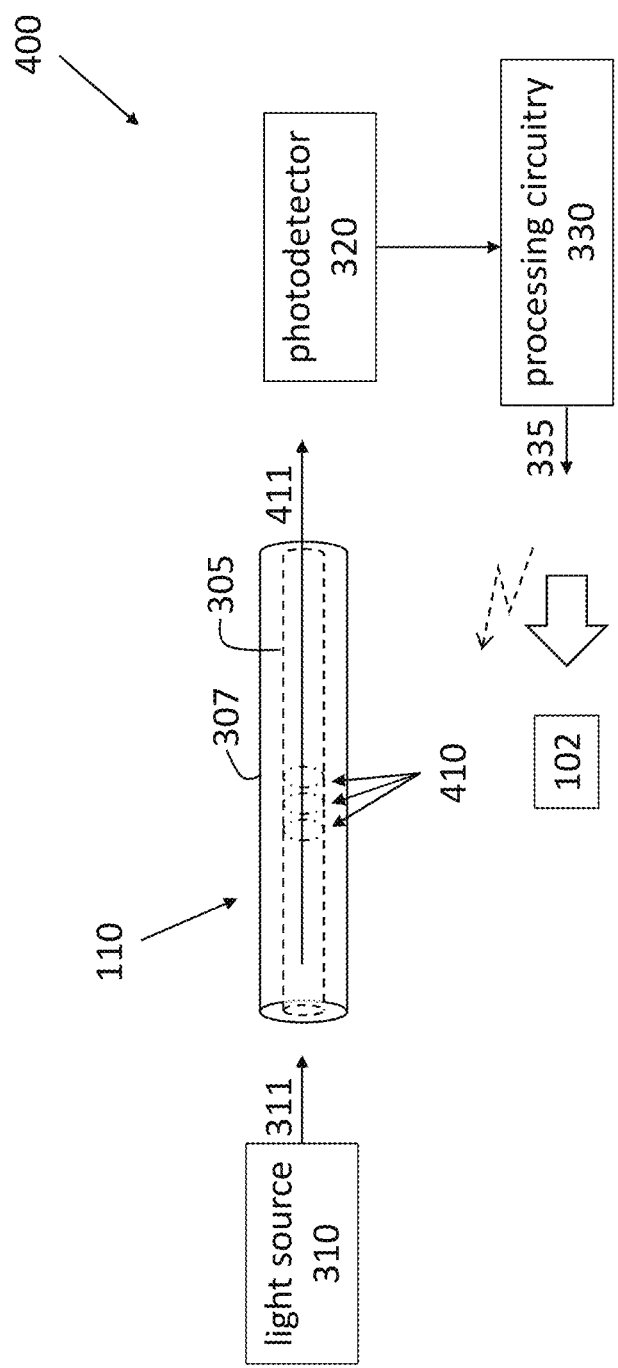
FIG. 4 is a block diagram of aspects of an exemplary fiber optic sensing network integrated into an atmospheric suit according to one or more embodiments.

FIGS. 3 and 4 are block diagrams of different exemplary fiber optic sensing networks 300, 400. Generally, sensing parameters such as strain, temperature, and pressure using sensors with optical fibers is known. Thus, only exemplary systems and a general outline is presented here. Different aspects of such sensors are shown in FIGS. 3 and 4. The arrangement and location of the components shown in FIGS. 3 and 4 is not intended to be limiting, and all of the components may be arranged within the atmospheric suit 100. As such, information about the integrity of the atmospheric suit 100 may be obtained anywhere (i.e., without connection or communication with another system) and in real time.

FIG. 3 is a block diagram of an exemplary fiber optic sensing network 300 integrated into an atmospheric suit 100 according to one or more embodiments. The optical fiber 110 includes a core 305 within a cladding 307. The lower density (lower refractive index) of the cladding 307, as compared with the core 305, channels light in the core 305 and prevents scattering. Light at the interface between the core 305 and cladding 307 is reflected. A light source 310 outputs incident light 311 that is channeled into the core 305 via a circulator 315. Reflected light 321 is directed by the circulator 315 to a photodetector 320.

Processing circuitry 330 (e.g., memory, one or more processors) uses characteristics of the reflected light 321

(e.g., total time of flight, Brillouin scatter, Raman scatter) to detect conditions such as strain, pressure change, or temperature change. Sensing a break in one or more optical fibers 110 involves recognizing a lack of response based on input of the incident light 311. Strain refers to stretching of the optical fibers 110 during impact by a micrometeoroid, for example. This stretching affects the round trip time for the incident light 311 and the reflected light 321 or causes a change in wavelength of the incident light 311 as detected in the reflected light 321, for example. Because certain conditions (e.g., strain due to impact) may be temporary and brief, the sampling rate at the photodetector 320 may be selected to ensure that such conditions are detected. Information 335 output by the processing circuitry 330 may include an indication of a break or strain or a quantification of pressure change or temperature change. Alternately or additionally, the information 335 may be an alert based on strain being detected or pressure change or temperature change exceeding a defined threshold value. The indication of strain may include an indication of the area of the atmospheric suit 100 affected. The alert may be provided to the wearer via the helmet 102 (e.g., audio or visual alert). Alternately or additionally, the alert may be transmitted.

FIG. 4 is a block diagram of aspects of an exemplary fiber optic sensing network 400 integrated into an atmospheric suit 100 according to one or more embodiments. As a comparison of FIGS. 3 and 4 indicates, the exemplary embodiment shown in FIG. 3 includes a circulator 315 because reflected light 321 rather than transmitted light 411 through the optical fiber 110 is of interest. That is, in the embodiment shown in FIG. 3, light enters and exits the optical fiber 110 on the same side. In the exemplary embodiment shown in FIG. 4, incident light 311 from the light source 310 traverses the optical fiber 110 and is detected by the photodetector 320 as transmitted light 411. The optical fiber 110 includes Bragg gratings 410 that modulate the refractive index within the core 305. The wavelength modulation caused by the Bragg gratings 410 may increase sensitivity of the fiber optic sensing network 400 to changes in pressure, temperature, or strain, for example.

While FIGS. 3 and 4 show one optical fiber 110 for explanatory purposes, the light source 310 may provide incident light 311 to two or more or even all of the optical fibers 110. A different light source 310 may be used for each layer 210 (i.e., each orientation of optical fibers 110), for example. Each optical fiber 110 may be associated with a photodetector 320. The processing circuitry 330 that obtains outputs from all of the photodetectors 320 may localize the area of a disturbance based on the specific optical fiber 110 or set of optical fibers 110 that indicate a break, strain, pressure change, or temperature change. The processing circuitry 330 may provide information 335 to the wearer (e.g., via the helmet 102, via haptic output) or may transmit the information. The processing circuitry 300 may perform additional functions in the atmospheric suit 100. As previously noted, all of the components shown in FIGS. 3 and 4 may be disposed within or on the atmospheric suit 100 such that the atmospheric suit 100, by itself, performs monitoring of its own status.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An atmospheric suit comprising:
   a torso portion comprising two or more layers;
   fibers of a first material arranged in each of the two or more layers; and
   optical fibers interspersed with the fibers of the first material in each of the two or more layers, wherein the fibers of the first material and the optical fibers in one of the layers are offset by at least 45 degrees from the fibers of the first material and the optical fibers in another of the layers.

2. The atmospheric suit according to claim 1, wherein the atmospheric suit is an extravehicular mobility suit for deep space applications, and the fibers of the first material are carbon, glass, or thermoplastic fibers.

3. The atmospheric suit according to claim 1, further comprising a light source, a photodetector, and processing circuitry.

4. The atmospheric suit according to claim 3, wherein the processing circuitry identifies an anomaly based on the photodetector, the anomaly including breakage of one or more of the optical fibers, strain, pressure change, or temperature change.

5. The atmospheric suit according to claim 4, wherein the processing circuitry identifies an area of the torso portion that experienced the anomaly.

6. The atmospheric suit according to claim 4, wherein the processing circuitry generates an alert based on identification of the strain, the pressure change, or the temperature change.

7. The atmospheric suit according to claim 6, further comprising a helmet, wherein the processing circuitry is configured to provide the alert to the helmet, and the helmet outputs an audio or visual indication of the alert to the wearer of the atmospheric suit.

8. The atmospheric suit according to claim 6, wherein the processing circuitry is configured to transmit the alert outside the atmospheric suit.

9. A method of manufacturing an atmospheric suit, the method comprising:
   assembling a torso portion with two or more layers;
   arranging fibers of a first material in each of the two or more layers; and
   interspersing optical fibers with the fibers of the first material in each of the two or more layers; and
   arranging the fibers of the first material and the optical fibers in one of the layers to be offset by at least 45 degrees from the fibers of the first material and the optical fibers in another of the layers.

10. The method according to claim 9, wherein the atmospheric suit is an extravehicular mobility suit for deep space applications, and the arranging the fibers of the first material includes arranging carbon, glass, or thermoplastic fibers.

11. The method according to claim 9, further comprising arranging a light source, a photodetector, and processing circuitry corresponding with the optical fibers.

12. The method according to claim 11, further comprising configuring the processing circuitry to identify an anomaly based on the photodetector, the anomaly including breakage of one or more of the optical fibers, strain, pressure change, or temperature change.

13. The method according to claim 12, wherein the configuring includes the processing circuitry identifying an area of the torso portion that experienced the anomaly.

14. The method according to claim 12, wherein the configuring includes the processing circuitry generating an alert based on identification of the strain, the pressure change, or the temperature change.

15. The method according to claim 14, further comprising including a helmet for attachment with the torso portion, wherein the configuring includes the processing circuitry providing the alert to the helmet, and the helmet outputting an audio or visual indication of the alert to the wearer of the atmospheric suit.

16. The method according to claim 14, wherein the configuring includes the processing circuitry transmitting the alert outside the atmospheric suit.

* * * * *